Oct. 15, 1940.  G. W. BRADY  2,217,856
MULTIENGINE SPEED SYNCHRONIZER
Filed Nov. 25, 1936    2 Sheets-Sheet 1
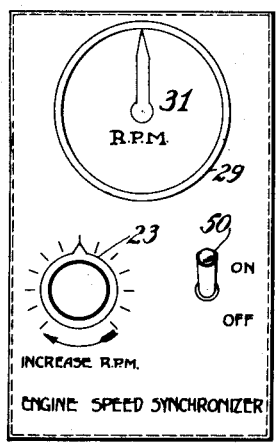
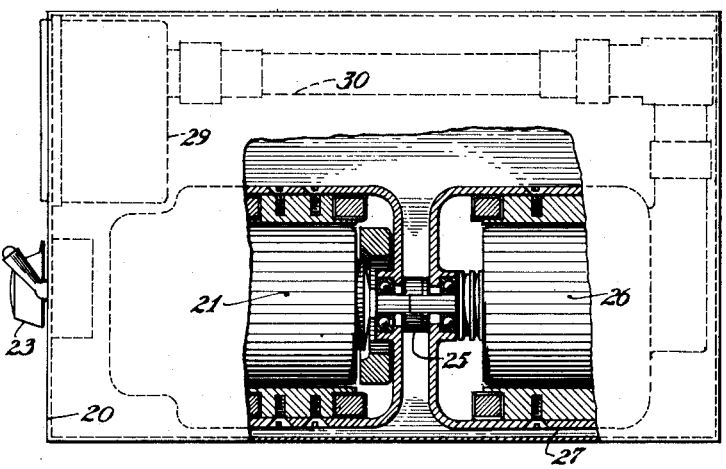
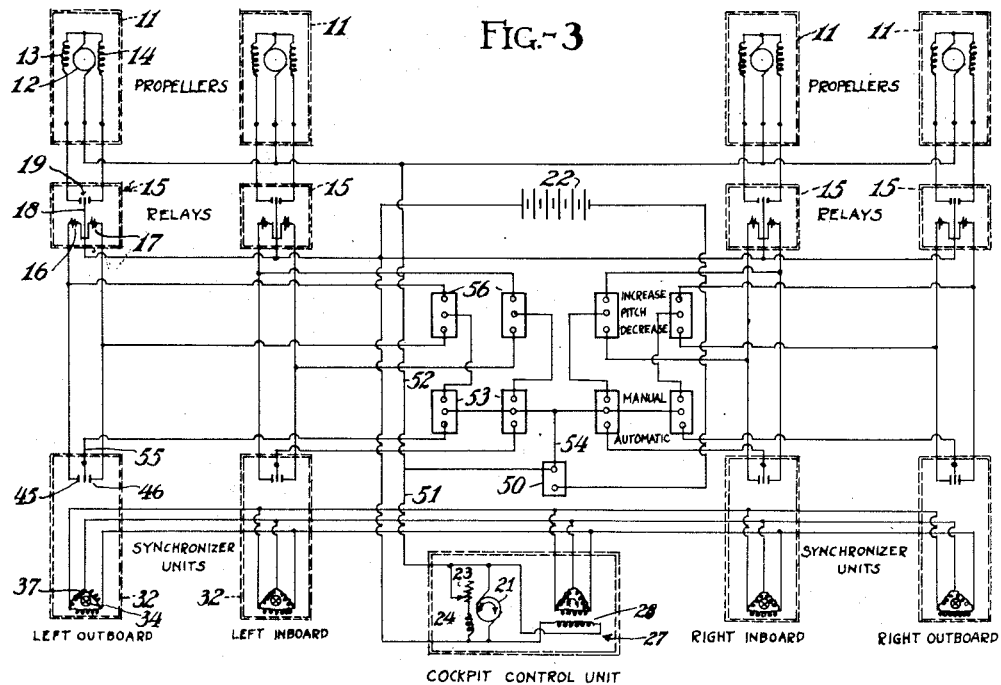
INVENTOR.
GEORGE W. BRADY
BY
ATTORNEY.

Oct. 15, 1940.  G. W. BRADY  2,217,856
MULTIENGINE SPEED SYNCHRONIZER
Filed Nov. 25, 1936  2 Sheets-Sheet 2
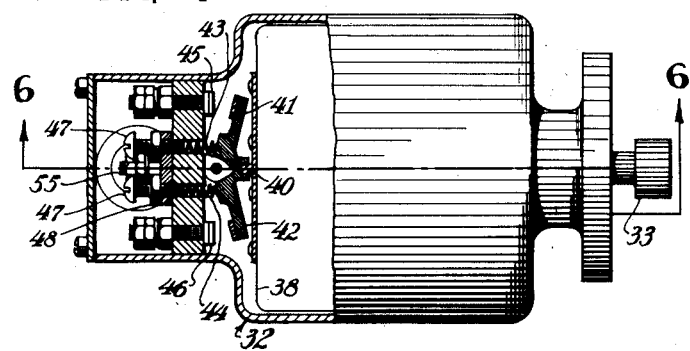
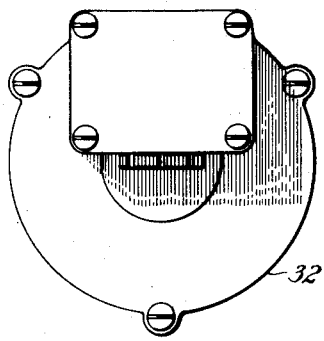
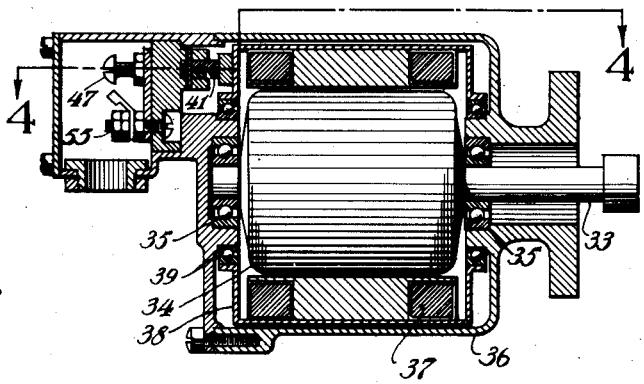
INVENTOR.
GEORGE W. BRADY
BY
ATTORNEY Patented Oct. 15, 1940

2,217,856

UNITED STATES PATENT OFFICE 2,217,856

MULTIENGINE SPEED SYNCHRONIZER

George W. Brady, Buffalo, N. Y., assignor to Curtiss-Wright Corporation, a corporation of New York Application November 25, 1936, Serial No. 112,661

1 Claim. (Cl. 170—135.6)

This invention relates to aircraft power plants, and is particularly for the purpose of providing means to synchronize the operating speed of a plurality of power plants.

In the operation of multiengine aircraft, one of the problems is to maintain, under normal cruising conditions, the rotational speed of all power plants at the same level, to avoid objectionable rhythmic beats set up by lack of synchronization, and likewise to provide for substantially equal power output from all of the power plants. Aircraft engines are now equipped in most instances with controllable pitch propellers, and recent developments have provided for automatic adjustment of the pitch of the propellers so that constant engine speed is maintained over a fairly wide range of power output as controlled by the engine throttle. For instance, when the engine throttle is set at any point from slightly below normal cruising speed to full throttle, the engine R. P. M. is maintained constant by virtue of changing the propeller pitch, and consequently, the load on the engine by a governor controlled apparatus which operates upon the propeller blade pitch changing mechanism.

One type of controllable pitch propeller is that shown in the Blanchard Patent No. 1,951,320, wherein an electric motor carried by the propeller may be energized to either increase or decrease the pitch of the propeller blades. In this invention, means are provided for energizing such an electric motor in the appropriate direction by means of a governor responsive to engine speed changes, to vary propeller pitch and hold engine R. P. M. constant.

In the present invention, I utilize a small A. C. motor for each aircraft power plant, the rotors of the respective motors being driven by the engines. I also provide an A. C. generator as a part of a master control unit, the output frequency of which may be selectively varied by changing the generator speed. The generator is connected to the stator windings of the several motors so that, if any motor rotor is rotating at such a speed that synchronism obtains between the rotating field and engine driven rotor of the motor, there will be no torque reaction between the stator and rotor. If there is a differential in the speed relationship between the generator (and consequently the rotating field of the motor) and the motor rotor, a force reaction will obtain between the motor rotor and stator, moving the stator, which is flexibly mounted, in the appropriate direction. A switch mechanism is associated with the motor stator, so that when said stator is moved, an appropriate relay circuit is closed to control the controllable pitch propeller to vary the blade pitch thereof whereby synchronism between said motor and generator will again obtain.

Objects of the invention are to provide an electrical system to maintain synchronism between a plurality of aircraft power plants; to provide a central cockpit control unit adapted to control one or more power plants as to their speed characteristics; to provide a speed control unit on each of a plurality of aircraft power plants, all of the several said speed control units being responsive to a single master control device accessible to the aircraft crew; to provide a generator-motor organization for the accomplishment of the foregoing objects; to provide a manually controllable generator by which a plurality of aircraft power plants may be controlled as to rotational speed.

Further objects will become apparent from a reading of the subjoined specification and claim, and from an examination of the accompanying drawings, in which similar numbers indicate similar parts, and in which:

Fig. 1 is a front elevation of the master control unit, adapted to be placed in a position available to the aircraft crew;

Fig. 2 is a side elevation, partly broken away and partly in section, showing the motor generator unit of the master control;

Fig. 3 is a wiring diagram of the control system adapted for the control of four aircraft power plants;

Fig. 4 is a plan, partly broken away, of the motor unit adapted to be attached to an aircraft power plant, this view also being a section on the line 4—4 of Fig. 6;

Fig. 5 is a rear elevation of the motor unit of Fig. 4; and

Fig. 6 is a section on the line 6—6 of Fig. 4.

Referring first to Fig. 3, each of the four sets of vertically aligned units are provided for one power plant, the several sets being designated according to the normal nomenclature applied to a plurality of power plant installations in an aircraft. Units 11 each designate the essential electrical mechanism of a controllable pitch propeller such as that shown in Patent No. 1,951,320 to Blanchard. Each includes a direct current motor armature 12, a pitch increasing field coil 13 and a pitch decreasing field coil 14, the several electrical conductors of the unit being suitably connected by means well known in the art, to a relatively fixed part of the aircraft. It is to be understood that the unit 11 rotates with the propeller, which in turn is driven by an engine. The current for the propeller motors is controlled by a relay 15 for each unit 11, the relays comprising pitch increasing and pitch decreasing solenoids 16 and 17 which may be selectively energized to actuate an armature 18 whereby the main circuit for the unit 11 is closed through a switch 19. The above recited structure is not essentially a part of this invention, since it comprises a normal control organization for the controllable pitch propeller.

The control system of this invention comprises first, a cockpit unit shown in Figs. 1 and 2, consisting of a housing 20 having mounted therein a direct current motor 21 adapted to be operated from the normal power supply of the aircraft which usually comprises a battery such as 22, shown in Fig. 3. This motor 21 is controllable as to speed by a rheostat 23 connected in series with the shunt field 24 of the motor 21. The shaft of the motor 21 is directly coupled at 25 to a rotor 26 of a small polyphase alternating current generator 27, the field being excited through a coil 28 connected to the power source 22. Alternately, the rotor may comprise a permanent magnet to avoid external excitation.

To the common shaft of the units 21 and 27 a tachometer 29 is mechanically connected through shafts and gearing designated as 30, the scale 31 of the tachometer being preferably calibrated in such a manner that it represents directly the desired R. P. M. of the several power plants which the unit is to control. It is apparent that the actual indication on the tachometer 29 will be directly manually controllable by the rheostat 23. In one embodiment actually built, an electric tachometer was used, connected into one phase winding of the generator.

Each power plant is provided with a directly mounted polyphase induction motor 32, shown in Figs. 4, 5 and 6, the rotor shaft 33 being mechanically connected to rotate at a speed proportional to that of its engine. The shaft 33 carries a squirrel cage rotor 34, and is mounted in ball bearings 35 in a housing 36. The stator unit for the motor 32, designated as 37, is carried in a cage 38 mounted in bearings 39 for oscillation with respect to the housing 36. Said cage carries a lug 40 engageable with one or the other of switch bell cranks 41 and 42, these bell cranks, and the stator 32, being urged to a central position shown in Fig. 4, by springs 43 and 44, respectively. If the cage 38 is displaced from the normal central position, one or the other of the bell cranks, 41 or 42, will engage with fixed switch contact 45 or 46, respectively, thus closing an energizing circuit for the appropriate solenoid 16 or 17 of the relay 15. Thereupon, the relay action causes actuation of the propeller pitch changing motor either forward or reversely.

All of the induction motors 32 are connected in parallel with the alternating current generator 27. By using the same number of poles in the motor and in the generator, the magnetic field caused by the stator winding of the motor will revolve at the same speed as the rotor of the generator.

One of the characteristics of an induction motor is that torque is approximately proportional to slip, which latter is the difference between the rotor speed and the speed of the electrically rotating field. When there is no slip, no torque is produced; if there is 10 R. P. M. slip, a certain finite torque is produced; if there is 20 R. P. M. slip, twice this torque is produced. If in the engine synchronizer unit, the rotor which is driven by the engine is rotating at the same speed as the electrically rotating field produced by the control generator, there will be no torque between the rotor and stator, and the stator 38 will be held in the neutral position by the centralizing springs 43 and 44. If the rotor 34 is turning faster than the electrically rotating field, there will be a torque in one direction; if it is turning slower, the torque will act in the opposite direction. When the actual slip, by virtue of a sufficient difference in R. P. M., develops torque enough to overcome the centralizing springs 43 or 44, the contact points 45 or 46 will be closed, and the propeller will change pitch through the action of the relay 15 and unit 11 until the engine speed is brought back toward synchronism. As the engine speed approaches synchronism, the slip in the motor 32 becomes less, so that the elements 45—41 or 46—42 will open the relay circuit to cause cessation of pitch change in the propeller. The apparatus will act upon each power plant as often as the speed of the engine varies from the speed of the alternating current generator.

Obviously, the plurality of power plants, each having an induction motor, may all be controlled from the same A. C. generator, and each power plant will be held in synchronism with the generator and consequently all power plants will be kept in synchronism with one another.

The amount of difference in R. P. M. between the generator and the motor rotor to cause propeller pitch changes to reduce such difference is controlled by the tension in the springs 43 and 44. Consequently, the tension of the springs 43 and 44 is made adjustable by means of adjusting screws 47 having suitable lock nuts 48. Proper adjustment of the springs not only determines the range of engine speed variation which is permitted, but also determines the sensitiveness of the synchronism adjustment between the several power plants.

A S. P. S. T. switch 50 is provided on the housing 20, this serving as a master switch to connect or disconnect the whole propeller electrical system. As shown in the wiring diagram (Fig. 3) one pole of the switch 50 is connected to the battery 22, and the other pole is connected on the one hand to the cockpit control unit and the propeller pitch changing motors, as at 51 and 52, respectively, and on the other hand is connected to a plurality of S. P. D. T. switches 53 through a conductor 54. These switches 53 serve to selectively connect the propellers so that they are automatically controlled by the generator and motor organization, by the connection of one of the poles of each said switch to respective contacts 55 of the motor units, these contacts respectively being connected to the bell cranks 41 and 42 in each synchronous motor.

A plurality of S. P. D. T. switches 56 are provided, one for each power plant, and the central poles thereof are respectively connected to the other poles of the switches 53. The poles of the switches 56 are connected in the circuits of the relays 15 for the manually controlled energization of the relay solenoids 16 and 17.

In operation, the switches 53 may selectively be set for manual or automatic propeller control and, if the switches are set for manual control, operation of the switches 56 serves to increase or decrease propeller pitch according to the desire of the operator. Obviously, the switches 56 are inactive when the corresponding switches 53 are set for automatic propeller operation.

Regarding the A. C. generator and A. C. motor, 27 and 32, respectively, these are arranged as polyphase units in order to attain better electrical characteristics in a manner that is well known in the art. The organization as described not only provides means for synchronizing the rotational speed of a plurality of aircraft power plants, but also provides a pre-selective speed control for said power plants to establish some specific R. P. M. at which the power plants are intended to operate.

A control apparatus of the character disclosed might also be utilized to control engine speed by means other than propeller pitch change. For instance, if fixed pitch propellers were used on the engines, the speed control and synchronizing mechanism might be utilized for adjusting the throttle opening of the engines. In effect, then, the device as a whole comprises a readily controllable electric governor for one or more power plants which are to be operated at some specific speed.

A primary advantage of the invention is the fact that all engines may be held in speed synchronism, at any speed pre-selected by the operator on the master control unit.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications and changes.

What is claimed is:

In an aircraft power plant speed control, an electrically operated controllable pitch propeller including an electric motor energizable to change the propeller blade pitch at a substantially constant rate of change, a master selectively constant speed alternator, a control unit including a power plant driven squirrel cage rotor and an alternator excited electrical field, a motor energizing switch responsive in its closure to torque reaction between said rotor and field, said torque reaction being due to slip between the stator field and the rotor, and resilient means adjustable in its stiffness to control the torque reaction essential to closure of said switch.

GEORGE W. BRADY.